United States Patent
Wang et al.

(10) Patent No.: US 10,853,409 B2
(45) Date of Patent: Dec. 1, 2020

(54) SYSTEMS AND METHODS FOR IMAGE SEARCH

(71) Applicant: SHANGHAI UNITED IMAGING HEALTHCARE CO., LTD., Shanghai (CN)

(72) Inventors: Jiyong Wang, Shanghai (CN); Xiangyang Xu, Shanghai (CN); Wanwan Cao, Shanghai (CN); Qingfeng Chang, Shanghai (CN); Qiancheng Sun, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 216 days.

(21) Appl. No.: 15/637,622

(22) Filed: Jun. 29, 2017

(65) Prior Publication Data

US 2018/0165305 A1   Jun. 14, 2018

Related U.S. Application Data

(63) Continuation of application No. PCT/CN2016/109721, filed on Dec. 13, 2016.

(51) Int. Cl.
*G06K 9/00* (2006.01)
*G06F 16/583* (2019.01)
(Continued)

(52) U.S. Cl.
CPC ........ *G06F 16/5838* (2019.01); *G06F 16/951* (2019.01); *G06K 9/4628* (2013.01);
(Continued)

(58) Field of Classification Search
CPC ...... G06F 16/5838; G06F 16/951; G06T 7/11; G06N 3/0454; G06N 3/086
(Continued)

(56) References Cited

U.S. PATENT DOCUMENTS 7,949,166 B2   5/2011   Moriya et al.
9,412,043 B2 *  8/2016   Shaji ................. G06F 16/51
(Continued)

FOREIGN PATENT DOCUMENTS

CN   104217225 A   12/2014
CN   104679863 A    6/2015
(Continued)

OTHER PUBLICATIONS

Anavi, Yaron, et al. "A comparative study for chest radiograph image retrieval using binary texture and deep learning classification." 2015 37th annual international conference of the IEEE engineering in medicine and biology society (EMBC). IEEE, 2015. (Year: 2015).*

(Continued)

*Primary Examiner* — Jonathan S Lee
(74) *Attorney, Agent, or Firm* — Metis IP LLC

(57) ABSTRACT

The present disclosure relates to a method and system for image searching. In the image searching process, different images comprising specific regions are obtained respective, and features in the specific regions of the different images are extracted respectively based on a convolution neural network algorithm. Feature data related to the features corresponding to the different images is calculated, and the different images are ranked based on the feature data so as to identify the image needed.

20 Claims, 10 Drawing Sheets

(51) Int. Cl.

| | | |
|---|---|---|
| *G06N 3/08* | (2006.01) | |
| *G06T 7/11* | (2017.01) | |
| *G06F 16/951* | (2019.01) | |
| *G06N 3/04* | (2006.01) | |
| *G06K 9/62* | (2006.01) | |
| *G06K 9/46* | (2006.01) | |
| *G06T 7/00* | (2017.01) | |

(52) U.S. Cl.
CPC ......... *G06K 9/6274* (2013.01); *G06N 3/0454* (2013.01); *G06N 3/086* (2013.01); *G06T 7/0012* (2013.01); *G06T 7/11* (2017.01); *G06K 2209/05* (2013.01); *G06T 2207/10081* (2013.01); *G06T 2207/10088* (2013.01); *G06T 2207/10104* (2013.01); *G06T 2207/10108* (2013.01); *G06T 2207/10132* (2013.01); *G06T 2207/30004* (2013.01)

(58) Field of Classification Search
USPC .......................................................... 382/195
See application file for complete search history.

(56) References Cited

U.S. PATENT DOCUMENTS

| | | | |
|---|---|---|---|
| 10,290,107 B1* | 5/2019 | Casas | G06T 7/11 |
| 2004/0161138 A1 | 8/2004 | Ashton | |
| 2009/0052768 A1 | 2/2009 | Zhao | |
| 2010/0266174 A1 | 10/2010 | Lobregt et al. | |
| 2011/0022622 A1 | 1/2011 | Boroczky et al. | |
| 2011/0182469 A1* | 7/2011 | Ji | G06K 9/4628 382/103 |
| 2011/0213774 A1 | 9/2011 | Buurman et al. | |
| 2012/0114256 A1 | 5/2012 | Akgul et al. | |
| 2012/0158717 A1 | 6/2012 | Unay et al. | |
| 2012/0194425 A1* | 8/2012 | Buelow | G06T 19/00 345/156 |
| 2016/0292856 A1* | 10/2016 | Niemeijer | G06T 7/0012 |

FOREIGN PATENT DOCUMENTS

| | | |
|---|---|---|
| CN | 104700118 A | 6/2015 |
| CN | 105117399 A | 12/2015 |
| CN | 105160361 A | 12/2015 |
| CN | 105447569 A | 3/2016 |
| CN | 105574859 A | 5/2016 |
| CN | 105718960 A | 6/2016 |
| CN | 105808732 A | 7/2016 |

OTHER PUBLICATIONS

Pedregosa, Fabian, et al. "Learning to rank from medical imaging data." International Workshop on Machine Learning in Medical Imaging. Springer, Berlin, Heidelberg, 2012. (Year: 2012).*
Xiong, Chao, et al. "Conditional convolutional neural network for modality-aware face recognition." Proceedings of the IEEE International Conference on Computer Vision. 2015. (Year: 2015).*
International Search Report in PCT/CN2016/109721 dated Aug. 30, 2017, 7 Pages.
Written Opinion in PCT/CN2016/109721 dated Aug. 30, 2017, 6 Pages.
Christopher J.C. Burges, From RankNet to LambdaRank to LambdaMART: An Overview, Microsoft Research Technical Report MSR-TR-2010-82, 19 Pages.

* cited by examiner

SYSTEMS AND METHODS FOR IMAGE SEARCH

CROSS-REFERENCE TO THE RELATED APPLICATION

This application is a continuation and claims priority to International Application No. PCT/CN2016/109721, filed on Dec. 13, 2016, the content of which is expressly incorporated herein by reference to its entirety.

TECHNICAL FIELD

The present disclosure generally relates to systems and methods for image search, and in particular, a system and method for extracting features of an image-to-be-identified and comparing the features of the image-to-be-identified with image features in an image database to provide images similar to the image-to-be-identified.

BACKGROUND

In a search for an image similar to an image-to-be-identified, images are usually compared with the image-to-be-identified based on a plurality of image features to obtain a search result that is similar to the image-to-be-identified. For example, when doctors diagnose and assess pulmonary nodules, the doctors usually consider similarities among a plurality of pulmonary nodules to provide a diagnosis of pulmonary sarcoidosis. In order to obtain an image that is the most similar to the image-to-be-identified, it is needed to compare the features of the image-to-be-identified with features of images as many as possible in the image database to determine the most similar image and provide objective and comprehensive assessment. With the increase of the number of images over time, it becomes difficult to obtain a stable assessment by image comparison with human eyes. Therefore, it is necessary to provide a system and method for accurately searching for images similar to the image-to-be-identified in the image database.

SUMMARY

According to some embodiments of the present disclosure, an image search method is provided. The method may include one or more steps of the following operations: obtaining a first image, the first image including a first region; obtaining a second image, the second image including a second region; obtaining a third image, the third image including a third region; extracting a first group of features of the first region based on a convolution neural network algorithm; extracting a second group of features of the second region based on the convolution neural network algorithm; extracting a third group of features of the third region based on the convolution neural network algorithm; calculating first data related to the first group of features and the second group of features; calculating second data related to the first group of features and the third group of features; and ranking the second image and the third image based on the first data and the second data.

In some embodiments, the method further may further include setting a second parameter, and extracting a second feature set related to the second region. The second feature set may include the second group of features. The method may further include extracting the first group of features related to the first region based on the second group of features.

In some embodiments, the second group of features may be selected from the second feature set based on a feature selection algorithm. In some embodiment, the feature selection algorithm may be a Correlation Based Feature Selection Algorithm.

In some embodiments, the first parameter or the second parameter may include at least one of the number of convolution neural network layers, a size of a convolution kernel, the number of convolution kernels, and the number of generated features.

In some embodiments, the convolution neural network algorithm may include a multilayer structure.

In some embodiments, the first data may be generated based on a difference between the first group of features and the second group of features. Optionally, the second data may be generated based on a difference between the first group of features and the third group of features.

In some embodiments, the method may include ranking the second image and the third image by a LambdaMART algorithm based on the first data and the second data. In some embodiments, the method may further include determining the second image or the third image based on the ranking.

In some embodiments, the method may further include positioning the first region in the first image by a computer-aided diagnosis. In some embodiments, the method may further include selecting the second region of the second image by the computer-aided diagnosis based on the first region.

In some embodiments, the first image, the second image, or the third image may be a two-dimensional (2D) image or a third-dimensional (3D) image.

In some embodiments, the first image, the second image, or the third image may be at least one of a PET image, a CT image, a SPECT image, an MRI image, or an ultrasonic image.

According to some embodiments of the present disclosure, an image reconstruction system is provided. The system may include an image acquisition device. The image acquisition may obtain a first image, a second image, and a third image, and position a first region, a second region, and a third region in the first image, the second image, and the third image, respectively. The system may further include an image analysis device. The image analysis device may include a feature extraction module. The feature extraction module may extract a first group of features of the first region, a second group of features of the second region, and a third group of features of the third region. The system may further include a feature analysis module. The feature analysis module may determine first data related to the first group of features and the second group of features, and second data related to the first group of features and the third group of features. The image analysis device may further include a ranking module. The ranking module may rank the second image or the third image based on the first data and the second data.

In some embodiments, the image acquisition device may further include positioning the first region in the first image by a computer-aided diagnosis. In some embodiments, the image acquisition device may further include positioning the second region in the second image by the computer-aided diagnosis.

In some embodiments, the first group of features may be extracted based on the second group of features or the third group of features.

In some embodiments, the feature extraction module may extract a second feature set related to the second region, wherein the second feature set may include the second group of features.

In some embodiments, the system may further include a feature selection module. The feature selection module may select the second group of features from the second feature set based on a feature selection algorithm, wherein the feature selection algorithm may include a Correlation Based Feature Selection Algorithm.

In some embodiments, the feature analysis module may generate the first data based on a difference between the first group of features and the second group of features. Optionally, the feature analysis module may generate the second data based on a difference between the first group of features and the third group of features.

In some embodiments, the ranking module may rank the second image and the third image by a LambdaMART algorithm based on the first data and the second data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

In order to illustrate the technical solutions related to the embodiments of the present disclosure, brief introduction of the drawings referred to the description of the embodiments is provided below. Obviously, drawings described below are only some embodiments of the present disclosure. Those having ordinary skills in the art, without further creative efforts, may apply the present disclosure to other similar scenarios according to the drawings. Unless stated otherwise or obvious from the context, the same reference numeral in the drawings refers to the same structure and operation.

DETAILED DESCRIPTION

Figure 1A:
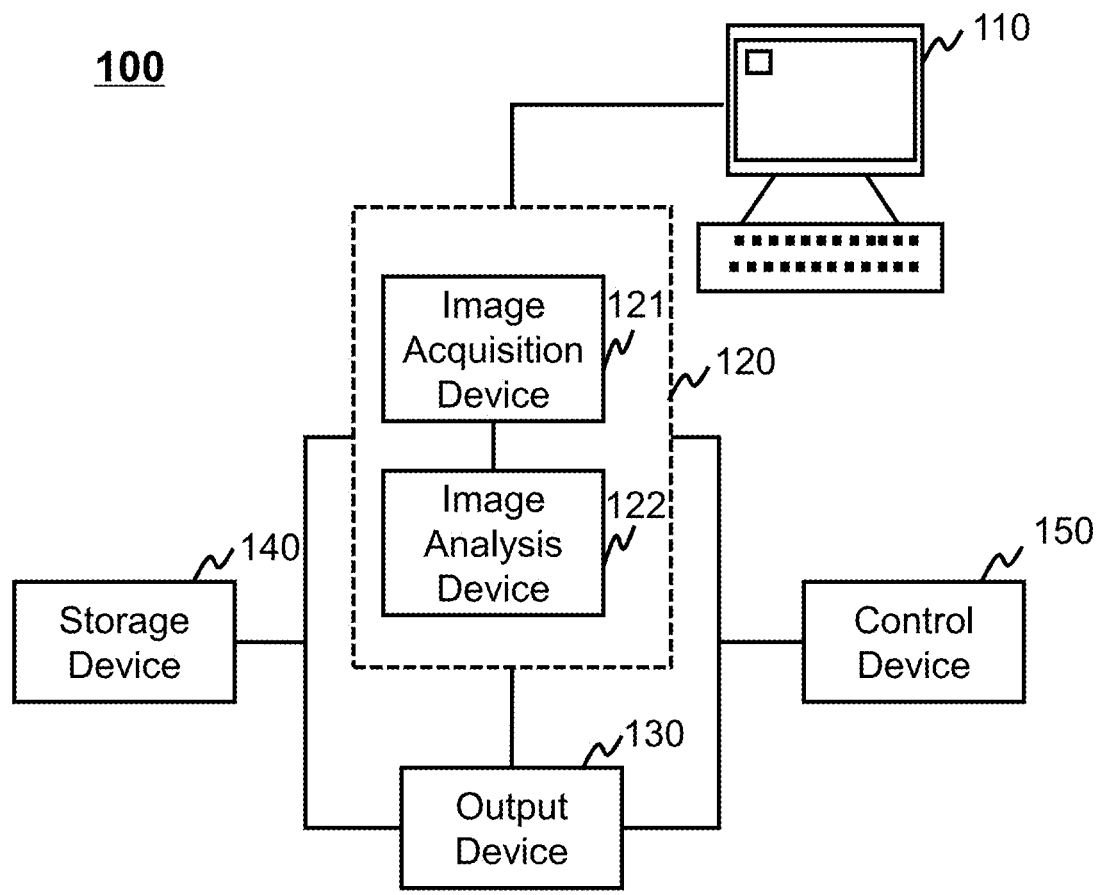
FIG. 1A is a schematic diagram illustrating an exemplary image search system according to some embodiments of the present disclosure.

As used in the disclosure and the appended claims, the singular forms "a," "an," and "the" may be intended to include the plural referents as well, unless the context clearly indicates otherwise. It will be further understood that the terms "comprise," and/or "include" when used in the disclosure, specify the presence of stated steps and elements, but do not preclude the presence or addition of one or more other steps and elements.

The system and method for image search described in the present disclosure refer to extracting features of an image-to-be-identified and comparing the features of the image-to-be-identified with features of images in an image database to provide images similar to the image-to-be-identified. The image search system may include an image processing engine, a storage device, an output device, and a control device.

Different embodiments of the present disclosure may be suitable for multiple fields including, medical science and science and technology derived from the medical science (e.g., medical device diagnosis, medical imaging, etc.), and image processing field (e.g., image processing in the fields of mathematics, physics, chemistry and chemical engineering, biology and biological engineering, electrical engineering, communication system, Internet, Internet of Things, news media, etc.). The application scenarios of different embodiments of the present disclosure may include web pages, browser plug-ins, user terminals, customized systems, enterprise internal analysis systems, artificial intelligence robots, or the like, or any combination thereof. The description of the fields is only for illustration purposes, and should not be designated as the only embodiment. Obviously, for persons having ordinary skills in the art, after understanding the basic principles of the image search method and system, may modify or change the forms or details of the fields without deviating from the basic principles. However, the modification and change are still under the teaching of the present disclosure. For example, in one embodiment of the present disclosure, the image-to-be-identified in the image search system 100 may be a medical image, a news picture, etc. The medical image may be a Positron Emission Tomography (PET) image, a Single-Photo Emission Computed Tomography (SPECT) image, a Computed Tomography (CT) image, a Magnetic Resonance Imaging (MRI) image, an ultrasound image, or the like, or any combination thereof. All such replacements, modifications, or changes are still within the scope of the present disclosure. In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to the drawings. Unless stated otherwise or obvious from the context, the same reference numeral in the drawings refers to the same structure and operation.

FIG. 1A is a schematic diagram illustrating an exemplary image search system according to some embodiments of the present disclosure. As shown in FIG. 1, the image search system 100 may include a user interface 110, an image processing engine 120, an output device 130, a storage device 140, and a control device 150. The image search system 100 illustrated in FIG. 1 only represents some embodiments of the present disclosure. Those having ordinary skills in the art, without further creative efforts, may modify, add, and simplify the image search system 100. For example, two apparatuses of the image search system 100 may be combined into one device, or one apparatus may be implemented in two or more devices. In some embodiments, multiple apparatuses may be implemented in a computing device (e.g., a computer, a mobile phone, a wearable computing device, etc.). In some embodiments, multiple apparatuses may be connected with each other via a network (not shown). The network may include a Local Area Network (LAN), a Wide Area Network (WAN), a public network, a private network, a Wireless Area Network (WLAN), a virtual network, a metropolitan area network, a public switched telephone network, or the like, or any combination thereof.

The user interface 110 may receive data and transmit the received data to other parts of the image search system 100. In some embodiments, the user interface 110 may receive parameters set by a user for the image processing engine 120, for example, receive algorithms associated with the image processing engine 120 set by a user. In some embodiments, the user interface 110 may transmit images to an image acquisition device 121. The user interface 110 may include one or more communication terminals. The communication terminal may include a mobile phone, a personal computer, a wearable device, a tablet computer, a smart TV, or the like, or any combination thereof.

The image processing engine 120 may obtain images similar to the image-to-be-identified. The image processing engine 120 may include an image acquisition device 121 and an image analysis device 122.

The image acquisition device 121 may obtain one or more images-to-be-identified and/or reference images. The image-to-be-identified and/or reference images may be obtained from the user interface 110, the storage device 140, and/or other parts of the image search system 100. The "image-to-be-identified" in the present disclosure refers to a benchmark image in the image search process; that is, during the image search process, the image search system 100 may search for reference images similar to the benchmark image based on the benchmark image. The image-to-be-identified may be an image of interest inputted by the user, or may include an image of which features can be identified. The "reference image" refers to an image that is stored in an image database, and the reference image may be compared with the image-to-be-identified according to a similarity between the reference image and the image-to-be-identified. In some embodiments, the reference images and/or the image-to-be-identified may be stored in one or more image databases. The image database may include the reference images, the image-to-be-identified, other images, and information associated with the images, etc. The information associated with the images may include the times of the images and contents of the images (e.g., an image may be a PET image, an MRI image, etc., and/or the image may be an image associated with a specific part of patient, etc.) being generated. The image-to-be-identified and/or reference images may be images in any form and/or having any content. In some embodiments, the image-to-be-identified and/or reference images may be two-dimensional (2D) images or third-dimensional (3D) images. In some embodiments, the image-to-be-identified and/or reference images may be PET images, SPECT images, CT images, MRI images, ultrasonic images, or the like, or any combination thereof. Obviously, the image-to-be-identified and/or references images may be images with other contents, for example, news pictures with texts and/or figures. The image acquisition device 121 may position a specific region in the image-to-be-identified and/or reference images. In some embodiments, the image acquisition device 121 may position a specific region (e.g., a lesion in a medical image) in the image-to-be-identified and/or reference images by a computer-Aided diagnosis. In some embodiments, the computer-aided diagnosis may generate one or more Region of Interest (ROI) images or Volume of Interest (VOI) images. The ROI/VOI image may be associated with the specific region.

The image analysis device 122 may determine the similarity between the image-to-be-identified and one or more reference images. The image analysis device 122 may extract features of the image to be identified and/or reference images, and compare the features of the image-to-be-identified with those of the reference images to determine the similarity between the image-to-be-identified and the reference images. The "feature" in the present disclosure refers to a separately measurable property of an image. In some embodiments, the features may include pixels of an image (e.g., a plurality of pixels of an image of a pulmonary nodule) and information corresponding to the pixels. For example, features including sizes of the pixels, the number of the pixels, gray levels of the pixels, textural feature of the pixels, morphologic feature of the pixels, gray-level feature of the pixels, wavelet feature of the pixels, histogram feature of the pixels, etc. may be used for image comparison. In some embodiments, the features may include statistical features of an image including, for example, the number of pixels in the vertical direction or horizontal direction of a 2D image, or a histogram of the gray level of the two-dimensional image. In some embodiments, the features may include features of an object shown in an image, for example, anatomy features of an organ. For example, the features may include an exhibition feature of a lesion. Take a pulmonary nodule as an example, the features may be used to describe the sharpness of the edge of the pulmonary nodule, and whether the edge is smooth or with burrs, with lobulation or not, with cavity or not, with calcification or not, and whether the pulmonary nodule is a ground-glass nodule or a solid nodule, etc. In some embodiments, the features may include features extracted according to a feature extraction algorithm, for example, features obtained by performing a convolution on an image based on a convolution neural network algorithm.

The image analysis device 122 may include but not limited to a Central Processing Unit (CPU), an Application Specific Integrated Circuit (ASIC), an Application Specific Instruction Set Processor (ASIP), a Physics Processing Unit (PPU), a Digital Processing Processor (DSP), a Field-Programmable Gate Array (FPGA), a Programmable Logic Device (PLD), a processor, a microprocessor, a controller, a microcontroller, or the like, or any combination thereof.

The output device 130 may receive, process, store, and/or transmit data from the user interface 110, the image acquisition device 121, the image analysis device 122, the storage device 140, and/or other parts of the image search system 100. The output device 130 may output one or more reference images similar to the image-to-be-identified. In some embodiments, the output device 130 may select one or more reference images similar to the image-to-be-identified based on the similarities between the references images and the image-to-be-identified. The output device 130 may output information associated with the image-to-be-identified and/or the reference images. For example, the output device 130 may output generation times of the images, storage paths of the images in the database, information associated with the contents of the images (e.g., the contents of the images may be associated with a certain identity number), etc. The output device 130 may include a display screen (e.g., an LCD screen, an LED screen, a CRT screen), a printer (e.g., an ink jet printer, a film printer), other devices used for outputting, or the like, or any combination thereof.

The storage device 140 may receive, process, and/or store data from the user interface 110, the image acquisition device 121, the image analysis device 122, the output device 130, the control device 150, and/or other parts of the image search system 100. The data may include the image-to-be-identified, the reference images, the features, information associated with the images, or the like, or any combination thereof. In some embodiments, the storage device 140 may be a device that may store information based on electric energy, for example, various kinds of memories, a Random Access Memory (RAM), a Read Only Memory (ROM). The RAM may include a dynamic RAM (DRAM), a static RAM (SRAM), a thyristor RAM (T-RAM), a zero-capacitor RAM (Z-RAM), or the like, or any combination thereof. The ROM may include a compact disk ROM (CD-ROM) drive, a hard disk, a magnetic tape, a Non-Volatile Random Access Memory (NVRAM), a Static Random-Access Memory (SRAM), a flash memory, an electrically erasable programmable ROM (EEPROM), an erasable programmable ROM (EPROM), a programmable ROM (PROM), or the like, or any combination thereof. The storage device 140 may be a device that may store information based on magnetic energy, for example, a hard disk, a floppy disk, a magnetic tape, a magnetic core memory, a magnetic bubble memory, a USB stick, a flash memory, etc. The storage device 140 may be a device that may store information based on optical means, for example, a compact disk (CD), a digital video disk (DVD), etc. The storage device 140 may be a device that may store information based on magnetic-optical means, for example, a magneto-optical disc, etc. The access method of the storage device 140 may be random access, serial access, read only memory, or the like, or any combination thereof. The storage device 140 may be an impermanent memory device or a permanent memory device. The above-mentioned storage devices are only examples, and the storage device 140 is not limited to the above-mentioned storage devices. The storage device 140 may be local, remote, or may be implemented on a cloud server.

The control device 150 may receive, process, store, and/or transmit information from the user interface 110, the image processing engine 120, the output device 130, the storage device 140, and/or other parts of the image search system 100. The information may include user settings from the user interface 110 (e.g., settings of output formats of the reference images, settings associated with algorithms used by the image analysis device 122, etc.), information transmitted to the storage device 140 (e.g., a storage format and a storage path of the image-to-be-identified, storage formats of the features extracted from the image-to-be-identified), and information transmitted to the output device 130 (e.g., whether to output one or more reference images), etc.

Figure 1B:
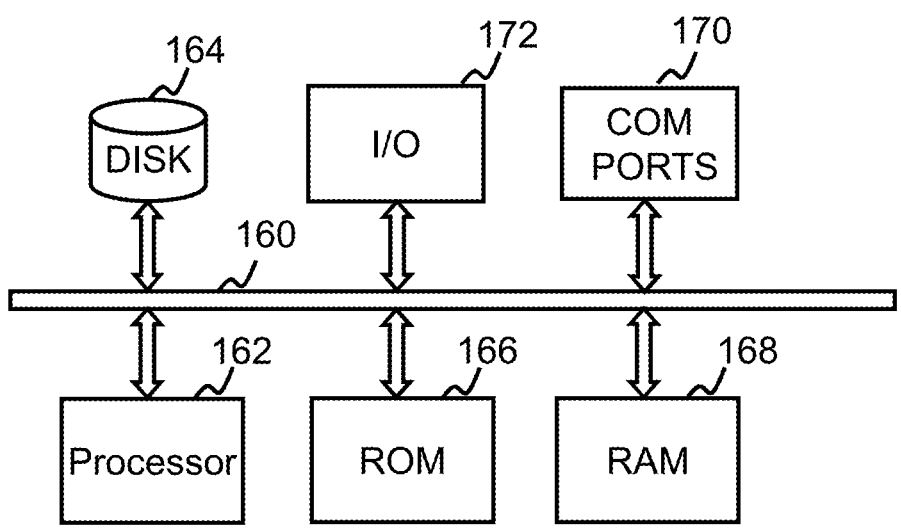
FIG. 1B is a schematic diagram illustrating an exemplary computing device according to some embodiments of the present disclosure.

FIG. 1B is a schematic diagram illustrating an exemplary computing device according to some embodiments of the present disclosure. The computing device may be used in a specific system of the present disclosure. The specific system of the present disclosure explains a hardware platform including a user interface according to a functional block diagram. The computing device may be configured to implement one or more components, modules, units, subunits (e.g., the user interface 110, the image processing engine 120, the control device 150) of the image search system 100 as described herein. The computing device may be a general-purpose computer or a special purpose computer; both may be configured to implement the specific system of the present disclosure. For convenience, only one such computer is shown, but computer functions providing information associated with image search in the embodiment may be implemented according to a distributed form of a group of similar platforms to distribute the processing load of the system.

As illustrated in FIG. 1B, the configuration of the computing device may include an internal communication bus 160, a processor 162, a hard disk 164, a ROM 166, a RAM 168, COM ports 170, an I/O component 172. The internal communication bus 160 may be configured to enable data communications among components of the computing device. The processor 162 may be used to execute program instructions to implement any function, component, module, unit, subunit of the image search system 100 described in the present disclosure. The processor 162 may include one or more processors. In some embodiments, the processor 162 may include but not limited to a microcontroller, a reduced instruction-set computer (RISC), an application-specific integrated circuit (ASIC), an application-specific instruction-set processor (ASIP), a central processing unit (CPU), a graphics processing unit (GPU), a physics processing unit (PPU), a microprocessor unit, a digital signal processor (DSP), a field-programmable gate array (FPGA), other circuit or processor that can execute program instructions, or the like, or any combination thereof.

The computing device may also include storage devices with different forms used to store programs and data, for example, the hard disk 164, the ROM 166, and the RAM 168 that may be configured to store various data files used during a processing process and/or a communication process by the computing device, and program instructions that may be executed by the processor 162. The storage devices may be internal storage devices of the image search system 100 (e.g., the storage device 140), or may be external storage devices outside the image search system 100 (e.g., connected via the user interface 110).

The COM ports 170 may be configured to facilitate data communications between the computing device and other components of the image search system 100 (e.g., the output device 130, the storage device 140). The I/O component 172 may support input/output data flow between the computing device and other components of the image search system 100 (e.g., the user interface 110). The computing device may also transmit information and data to a network and receive information and data from the network via the COM ports 170. The formats of the information outputted by the image search system 100 may include but not limited to number, character, instruction, pressure, sound, image, system, software, program, or the like, or any combination thereof. In some embodiments, the I/O component 172 may include but not limited to a display, a printer, a graphic plotter, a video output device, a language output device, or the like, or any combination thereof. The outputted information may be transmitted to a user or not. The outputted information that is not transmitted may be stored in the storage device 140, the hard disk 164, the ROM 166, the RAM 168, or may be deleted.

It should be noted that the storage devices (e.g., the hard disk 164, the ROM 166, the RAM 168) and/or the processor 162 described above may be implemented in a system, or may be implemented via a cloud computing platform to execute corresponding functions. The cloud computing platform may include but not limited to a storage could platform mainly used for data storage, a computing cloud platform mainly used for data processing, and an integrated cloud computing platform which can both store data and process data. The cloud computing platform used by the image search system 100 may be a public cloud, a private cloud, a community cloud, a hybrid cloud, etc. For example, according to actual needs, a part of the information received by the image search system 100 may be processed and/or stored via the cloud computing platform. The other parts of the information received by the image search system 100 may be processed and/or stored via local processing devices and/or storage devices.

Figure 2:
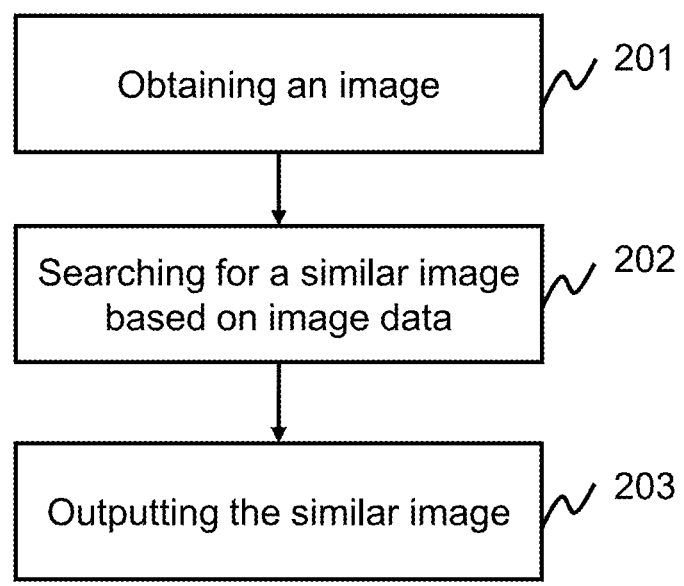
FIG. 2 is a flowchart illustrating an exemplary process for image search according to some embodiments of the present disclosure.

FIG. 2 is a flowchart illustrating an exemplary process for image search according to some embodiments of the present disclosure. In 201, images may be obtained. The obtained images may be the image-to-be-identified and/or the reference images. The obtained images may include images associated with one or more ROIs and VOIs. The acquisition of the image-to-be-identified and/or the reference images may be executed by the image acquisition device 121.

In 202, images similar to the image-to-be-identified may be searched for based on data of the image-to-be-identified. The search process may include determining similarities between the image-to-be-identified and a plurality of reference images respectively and rank the plurality of reference images based on the similarities. The similarity between the image-to-be-identified and a reference image may be determined by determining a similarity between features of the image-to-be-identified and features of the reference image. In some embodiments, the search process may include determining similarities between one or more ROI/VOI images of the image-to-be-identified and the ROI/VOI images of the plurality of reference images and rank the plurality of reference images based on the similarities. The extracting of the image data and searching for the images similar to the image-to-be-identified may be executed by the image acquisition device 121 and the image analysis device 122. The image data may include types of the image-to-be-identified and/or the reference images (e.g., a PET image, a SPECT image, a CT image, an MRI image, etc.), the ROI/VOI images obtained from the image-to-be-identified and/or the reference images, the features extracted from the ROI/VOI images, etc.

In 203, one or more reference images similar to the image-to-be-identified may be determined based on the ranking result. The one or more reference images similar to the image-to-be-identified described herein refer to the reference images that satisfy a condition. For example, the higher the rank of a similarity is, the higher the similarity between a corresponding reference image and the image-to-be-identified may be. The images with the top 5, 10, or 20 ranks may be determined as the reference images. The determination of the reference images may be executed by the output device 130.

The description above is merely provided for the purposes of illustration, and should not be designated as the only practical embodiment. Obviously, for persons having ordinary skills in the art, after understanding the basic principle of the image search system and method, may make various variations and modifications associated with forms and details of the above system and method under the teachings of the present disclosure. However, those variations and modifications do not depart from the scope of the present disclosure. For example, in 201, other information associated with the image-to-be-identified may be obtained, and the search process may be performed based on the information. Particularly, one or more features of the image-to-be-identified or semantic descriptions associated with the one or more features of the image-to-be-identified may be obtained. The subsequent search process may be searching for images or information having similar features, or searching for images that satisfy the semantic descriptions.

Figure 3:
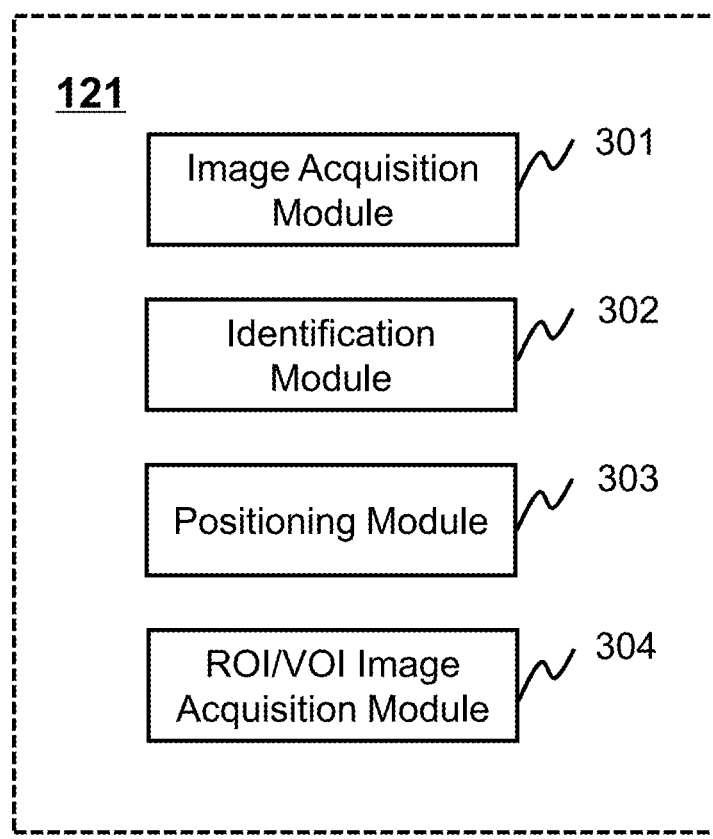
FIG. 3 is a schematic diagram illustrating an exemplary image acquisition device according to some embodiments of the present disclosure.

FIG. 3 is a schematic diagram illustrating an exemplary image acquisition device 121 according to some embodiments of the present disclosure. The image acquisition device 121 may include an image acquisition module 301, an identification module 302, a positioning module 303, an ROI/VOI image acquisition module 304, and other parts that can perform functions of the image acquisition device 121. Obviously, the image acquisition device 121 illustrated in FIG. 3 only represents some embodiments of the present disclosure. Those having ordinary skills in the art, without further creative efforts, may make multiple modifications, additions, and deletions under the teachings of the descriptions of the image acquisition device 121. For example, two modules of the image acquisition device 121 may be combined into a single module, or one module of the image acquisition device 121 may be divided into two or more modules.

The image acquisition module 301 may be used to obtain one or more images-to-be-identified and/or reference images. Types of the images-to-be-identified and/or the reference images may be various. In some embodiments, the images-to-be-identified and/or the reference images may be 2D images and/or 3D images. In some embodiments, the images-to-be-identified and/or the reference images may be PET images, CT images, SPECT images, MRI images, ultrasonic images, or the like, or any combination thereof.

The identification module 302 may be configured to identify the image-to-be-identified and/or the reference images. The identification module 302 may identify the types and contents of the image-to-be-identified and/or the reference images. In some embodiments, the identification module 302 may identify whether the image-to-be-identified and/or the reference images are 2D images or 3D images. In some embodiments, the identification module 302 may identify whether the image-to-be-identified and/or the reference images are PET images, CT images, SPECT images, MRI images, or ultrasonic images.

The positioning module 303 may position one or more specific regions in the image-to-be-identified and/or the reference images. The specific region may include an ROI or a VOI. In some embodiments, the positioning module 303 may position the specific region in the identified images by a computer-aided diagnosis (CAD).

The ROI/VOI image acquisition module 304 may obtain ROI/VOI image of the image-to-be-identified and/or ROI/VOI images of the reference images. The ROI/VOI images may be images generated by extracting the specific regions from the image-to-be-identified and/or the reference images. The ROI/VOI images may be 2D images or 3D images. In some embodiments, for 2D image-to-be-identified and/or 2D reference images, images obtained by the ROI/VOI image acquisition module 304 may be ROI images; for 3D image-to-be-identified and/or 3D reference images, images obtained by the ROI/VOI image acquisition module 304 may be VOI images. In some embodiments, the ROI/VOI images may be the image-to-be-identified and/or the reference images themselves, or parts of the image-to-be-identified and/or the reference images. Merely take a medical lung image as an example, in the ROI/VOI image, the whole lung or a specific region in the lung may be shown. The specific region may include a region of lung lesion or a region of a lung nodule.

The ROI/VOI images may be obtained manually. For example, medical workers may designate a lesion. The ROI/VOI images may be obtained by computer-based automatic recognition. In some embodiments, the ROI/VOI images may be obtained by a computer-aided diagnosis. For example, after identifying the lesion, the computer may designate the lesion as a target region, and generate an ROI/VOI image based on the target region. As another example, after identifying the lesion, the computer may designate a region as the target region, and generate an ROI/VOI image based on the target region. The target region may include the lesion. The target region may be a region with the same or similar outline with the lesion, or a region with other outlines. The area of the target region may be the same as or similar to the area of the lesion or may be larger than the area of the lesion by 1%, 3%, 5%, 10%, 50%, or any other random number. The lesion used herein may be an abnormal region in a biological tissue, and in an image, the abnormal region may express a "mutation" or a "shadow" that is different with normal tissues.

Obviously, the image acquisition device 121 illustrated in FIG. 3 only represents some embodiments of the present disclosure. Those having ordinary skills in the art, without further creative efforts, may make various modifications, additions, and deletions under the teachings of the descriptions of the image acquisition device 121. For example, in some embodiments, the positioning module 303 and the ROI/VOI image acquisition module 304 may be combined into a single module. In some more particular embodiments, the positioning module 303 may position one or more regions in the image-to-be-identified and/or the reference images by a computer-aided diagnosis, and obtain the ROI/VOI image(s) of the one or more regions.

Figure 4:
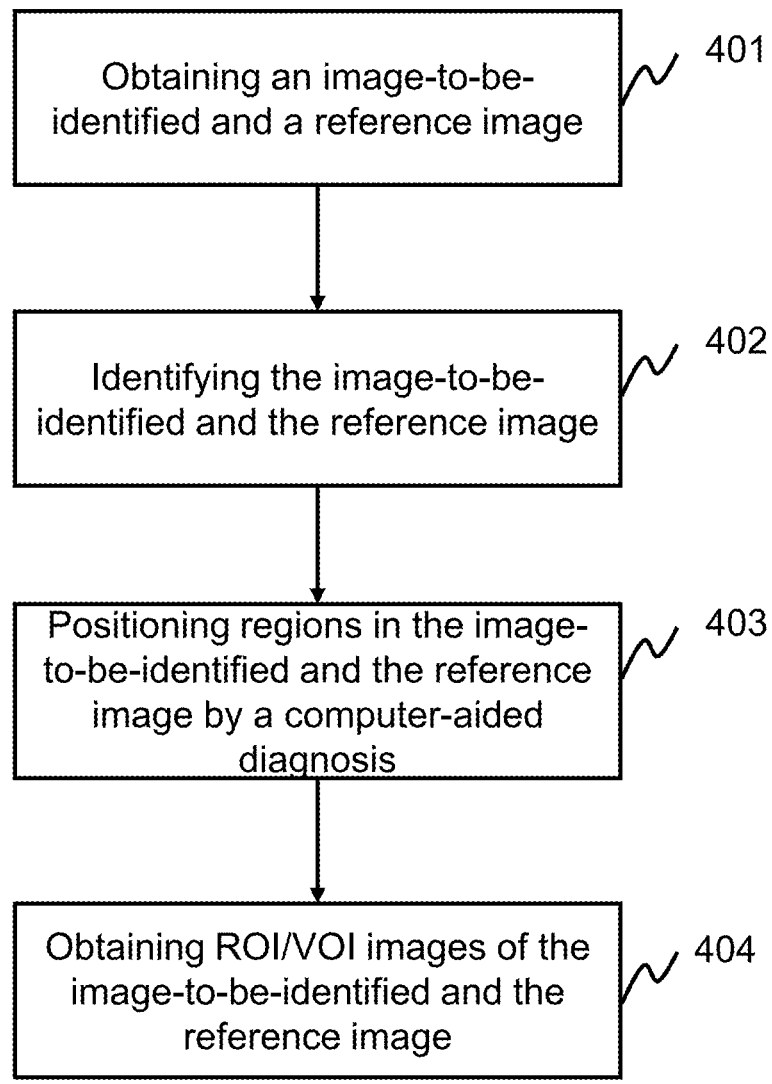
FIG. 4 is a flowchart illustrating an exemplary process for image acquisition according to some embodiments of the present disclosure.

FIG. 4 is a flowchart illustrating an exemplary process for image acquisition according to some embodiments of the present disclosure. In 401, the image acquisition process may include obtaining an image-to-be-identified and/or reference images. The acquisition of the image-to-be-identified and/or the reference images may be executed by the image acquisition module 301. The image-to-be-identified and/or the reference images may be obtained from the user interface 110 and/or the storage device 140. In some embodiments, the image search system 100 may obtain one or more reference images from an image database.

In 402, the image identification process may include identifying the image-to-be-identified and/or the reference images. The identification process may be executed by the identification module 302. In some embodiments, the image search system 100 may determine whether the image-to-be-identified and/or the reference images are 2D images and/or 3D images based on a determination that whether there is 3D data (e.g., a pixel or voxel in a 3D coordinate system) in the images. In some embodiments, the image search system 100 may determine the contents of the image-to-be-identified and/or the reference images (e.g., whether the images are PET images, whether the images are associated with the same patient, etc.) based on information associated with the images (e.g., types of the images, storage paths of the images, symbols in the images, etc.).

In 403, one or more regions may be positioned in the image to be identified and/or reference images. The positioning process may be executed by the positioning module 303. In some embodiments, the one or more regions may be positioned in the image-to-be-identified and/or the reference images by a computer-aided diagnosis. In some embodiments, the image search system 100 may divide the image-to-be-identified and/or the reference images based on one or more models (e.g., biological structure models, image pixel distribution models, gray level distribution models, etc.), and position the one or more regions based on the division.

In 404, ROI/VOI image(s) associated with the one or more regions may be obtained. The ROI/VOI image(s) may be obtained by the ROI/VOI image acquisition module 304. In some embodiments, the ROI/VOI image(s) may be obtained by extracting specific region(s) from the image-to-be-identified and/or the reference images. For example, in an image of a lung, the ROI/VOI image may be an image corresponding to the lesion area. In some embodiments, the image search process may further include extracting characteristic parameters of the ROI/VOI image(s). In some embodiments, the characteristic parameters may include area, the average value of the gray level, variance, standard deviation, circularity, sphericity, moment, maximum value, minimum value, moment descriptor, Fourier descriptor, or the like, or any combination thereof.

Figure 5:
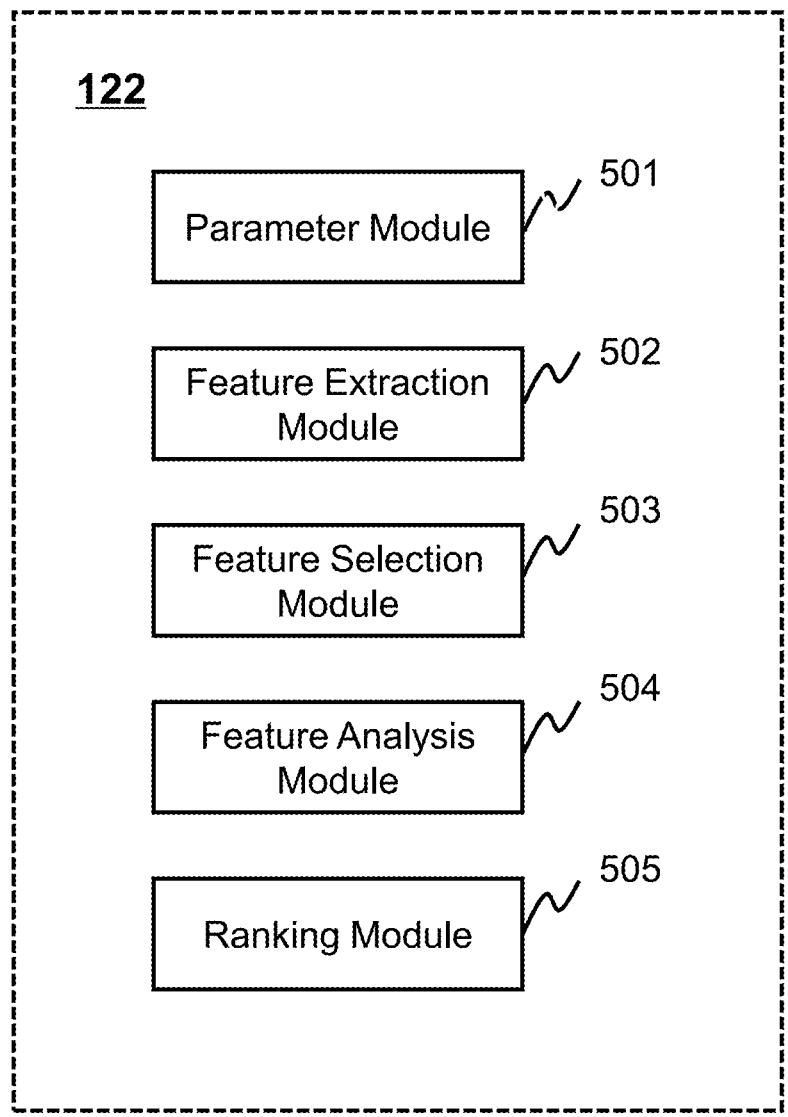
FIG. 5 is a schematic diagram illustrating an exemplary image analysis device according to some embodiments of the present disclosure.

FIG. 5 is a schematic diagram illustrating an exemplary image analysis device 122 according to some embodiments of the present disclosure. The image analysis device 122 may include a parameter module 501, a feature extraction module 502, a feature selection module 503, a feature analysis module 504, a ranking module 505, and/or other parts that can perform functions of the image analysis device 122. Obviously, the image analysis device 122 illustrated in FIG. 5 only represents some embodiments of the present disclosure. Those having ordinary skills in the art, without further creative efforts, may make various modifications, additions, and deletions under the teachings of the descriptions of the image analysis device 122. For example, two modules of the image analysis device 122 may be combined into a single module, or one module of the image analysis device 122 may be divided into two or more modules.

The parameter module 501 may be configured to receive, process, and/or store one or more parameters. The one or more parameters may be associated with the feature extraction module 502, the feature selection module 503, the feature analysis module 504, and/or the ranking module 505. The one or more parameters may include information of the feature extraction module 502, the feature selection module 503, the feature analysis module 504, and/or the ranking module 505. Take a convolutional neural network algorithm as an example, the information of the feature extraction module 502 may include the set number of layers, a size of a convolution kernel, the number of convolution kernels, a window size of a pooling layer, a matching type of the pooling layer and the convolutional layer, a position of a ReLU layer, etc. The information of the feature selection module 503 may include the number of the selected features, types of the selected features, etc. The information of the feature analysis module 504 may include methods for comparing or analyzing the features of the image-to-be-identified and/or reference images. The information of the ranking module 505 may include the number of ranked features, ranking methods, etc. For the image-to-be-identified, the image search system 100 may set a parameter (for convenience, hereafter referred to as "the first parameter"). For the reference images, the image search system 100 may set a parameter (for convenience, hereafter referred to as "the second parameter"). The first parameter and second parameter may include parameters that the parameter module 501 may receive, process, and/or store, or the like, or any combination thereof. In some embodiments, the first parameter and second parameter may be the same or may be different.

The feature extraction module 502 may be configured to extract features of the ROI/VOI images associated with the image-to-be-identified and/or the reference images. A feature of an ROI/VOI image may refer to a separately measurable property of the ROI/VOI image. In some embodiments, the features of the ROI/VOI images may include a gray level statistical feature, a textural feature, a morphologic feature, a wavelet feature, a histogram feature, or the like, or any combination thereof. In some embodiments, the features of the ROI/VOI images may be image information extracted based on one or more models (e.g., a convolution neural network algorithm model or models of other algorithms). The image information may refer to results associated with the image determined based on a specific algorithm. The features of the ROI/VOI images may be included in an ROI/VOI image feature set. For example, the features of the ROI/VOI image of the image-to-be-identified may be included in an ROI/VOI image feature set of the image-to-be-identified; the features of the ROI/VOI images the one or more reference images may be included in an ROI/VOI image feature set of the reference images. The ROI/VOI image feature set may include one or more image features, which may be obtained by the same model, or by different models.

The feature selection module 503 may be configured to select part or all of the features of the ROI/VOI images in the ROI/VOI image feature set. The feature selection module 503 may perform the feature selection based on one or more feature selection algorithms. For images-to-be-identified with different types, the feature selection module 503 may apply the same or different feature selection algorithms. The feature selection algorithms may be selected by manual settings or may be obtained by the feature selection module 503 by learning a search history of images with a similar type to the image-to-be-identified. In some embodiments, the feature selection algorithm may be a Correlation-Based Feature Selection (CFS) algorithm.

The feature analysis module 504 may analyze and obtain data associated with the features of the ROI/VOI images. The data associated with the features of the ROI/VOI images may include the features of the ROI/VOI image of the image-to-be-identified, the features of the ROI/VOI images of the reference images, and/or feature differences between the features of the ROI/VOI image of the image-to-be-identified and the features of the ROI/VOI images of the reference images. The feature differences may be determined based on differences between feature vectors of the features of the ROI/VOI image of the image-to-be-identified and feature vectors of the features of the ROI/VOI images of the reference images. In some embodiments, the feature vectors may be expressed by performing a specific operation (e.g., permutation, combination) on pixels of the features of the ROI/VOI images. In some embodiments, the number of pixels in the ROI/VOI image of the image-to-be-identified and the number of pixels in an ROI/VOI image of a reference image may be the same. In some embodiments, the feature difference may be indicated by a gray level difference between the corresponding pixels in two ROI/VOI images. In some embodiments, the feature difference may be indicated by a difference between the image information of two ROI/VOI images determined by the same algorithm.

The ranking module 505 may rank the reference images based on data associated with the image features. The ranking module 505 may rank the reference images based on a LambdaMART algorithm. In some embodiments, the higher the rank of a reference image is, the higher the similarity between the reference image and the image-to-be-identified may be.

Obviously, the image analysis device 122 illustrated in FIG. 5 only represents some embodiments of the present disclosure. Those having ordinary skills in the art, without further creative efforts, may make various modifications, additions, and deletions under the teachings of the descriptions of the image analysis device 122. For example, in some embodiments, the feature analysis module 504 and the ranking module 505 may be combined into one module.

Figure 6:
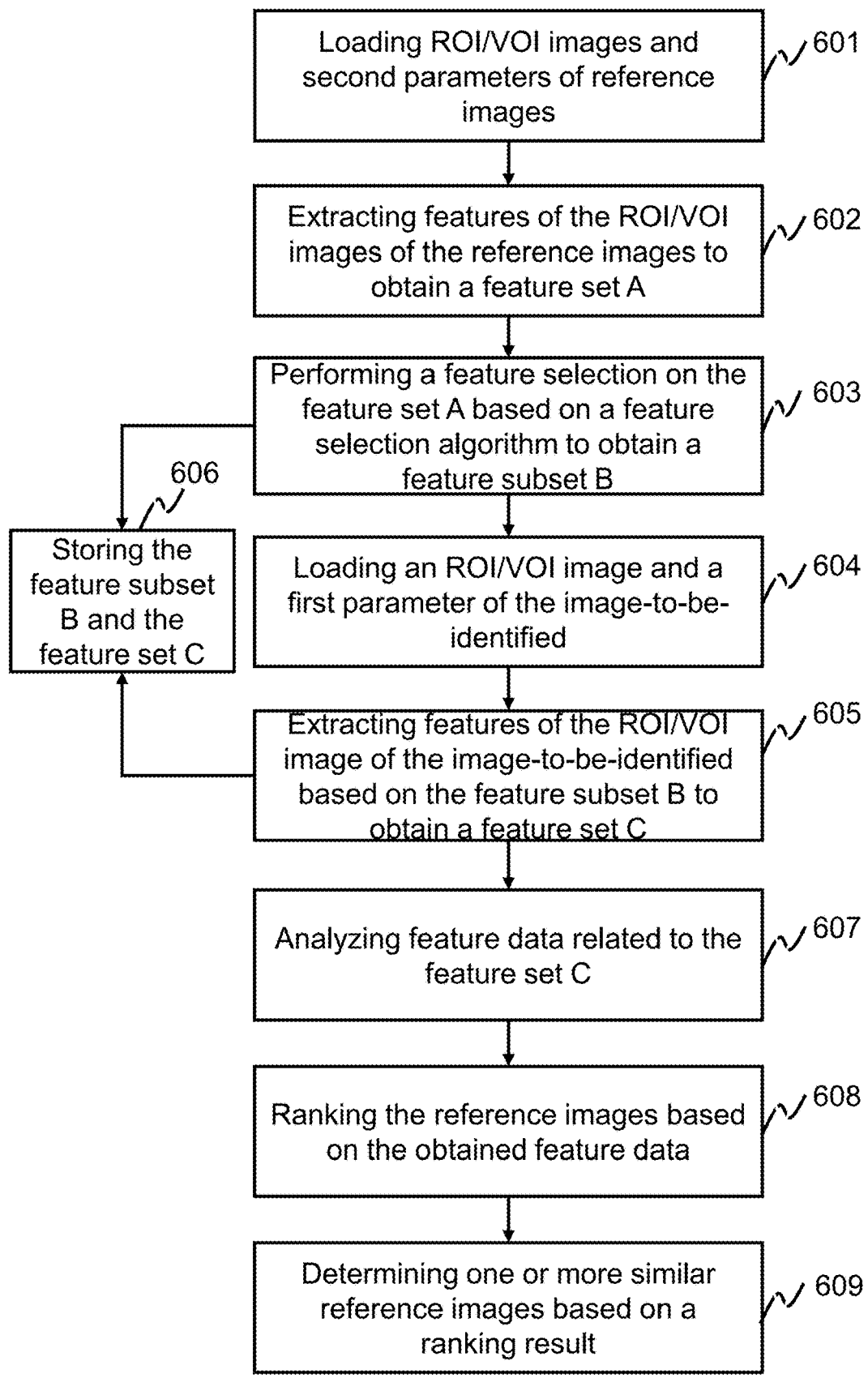
FIG. 6 is a flowchart illustrating an exemplary process for image analysis according to some embodiments of the present disclosure.

FIG. 6 is a flowchart illustrating an exemplary process for image analysis according to some embodiments of the present disclosure. In 601, the image search system 100 may load the ROI/VOI images and the second parameter of the reference images. The ROI/VOI images and the second parameter of the reference images may be obtained by the parameter module 501.

In 602, the image search system 100 may extract features of the ROI/VOI images of the reference images based on the second parameter and generate a feature set A. The extraction of the features of the ROI/VOI images of the reference images may be executed by the feature extraction module 502. In some embodiments, the second parameter may include a method for extracting the features of the ROI/VOI images of the reference images based on a convolution neural network algorithm. In some embodiments, the features of the ROI/VOI images of the reference images may be stored in the storage device 140 and/or other parts of the image search system 100. The image search system 100 may obtain the features of the ROI/VOI images of the reference images directly. In some embodiments, the second parameter may include the number of the features of the ROI/VOI images to be extracted, for example, 500.

In 603, the image search system 100 may perform a feature selection on the feature set A based on a feature selection algorithm to obtain a feature subset B. The feature selection may be executed by the feature selection module 503. In some embodiments, the feature selection algorithm may be a Correlation-Based Feature Selection (CFS) algorithm.

In 604, the image search system 100 may load the ROI/VOI image and the first parameter of the image-to-be-identified. The ROI/VOI image and the first parameter of the image-to-be-identified may be obtained by the parameter module 501. In some embodiments, the first parameter may be same as or different with the second parameter. For example, the first parameter and the second parameter may include the same algorithm used for extracting image features. As another example, the first parameter and the second parameter may include different numbers of features to be extracted. In some embodiments, the first parameter may be obtained based on a feature parameter corresponding to the feature subset B. For example, the first parameter may include a method for extracting the feature subset B. As another example, in the first parameter, the number of features to be extracted may be set as being equal to the number of the features included in the feature subset B.

In 605, the image search system 100 may extract the features of the ROI/VOI image of the image-to-be-identified based on the feature subset B and the first parameter to generate a feature set C. The features of the ROI/VOI image of the image-to-be-identified may be extracted by the feature extraction module 502. In some embodiments, the first parameter may include a method for extracting the features of the ROI/VOI image of the image-to-be-identified based on a convolution neural network algorithm.

In 606, the image search system 100 may store the feature subset B of the ROI/VOI images of the reference images and/or the feature set C of the ROI/VOI image of the image-to-be-identified. The feature subset B of the ROI/VOI images of the reference images and/or the feature set C of the ROI/VOI image of the image-to-be-identified may be stored in the storage device 140 and/or other parts of the image search system 100. In some embodiment, the feature subset B of the ROI/VOI images of the reference images and/or the feature set C of the ROI/VOI image of the image-to-be-identified may be stored in the storage device 140 in the form of a feature tree (e.g., a feature index tree established based on Euclidean Distance).

In 607, the image search system 100 may analyze and obtain feature data associated with the feature set C. The feature data associated with the feature set C may be analyzed and obtained by the feature analysis module 504. In some embodiments, the feature analysis module 504 may compare the feature set C of the ROI/VOI image of the image-to-be-identified and the feature subset B of the ROI/VOI images of the reference images to obtain one or more feature differences. In some embodiments, the feature analysis module 504 may compare all the features in the feature set C of the ROI/VOI image of the image-to-be-identified and all the features in the feature subset B of the ROI/VOI images of the reference images to obtain the feature differences; or the feature analysis module 504 may compare parts of the features in the feature set C of the ROI/VOI image of the image-to-be-identified and corresponding parts of the features the feature subset B of the ROI/VOI images of the reference images to obtain the feature differences.

In 608, the image search system 100 may rank the reference images based on the data associated with the features. The data associated with the features may include a feature difference between two features, feature differences among a plurality of features, etc. In a ranking result, the higher the similarity between the image-to-be-identified and a corresponding reference image is, the higher the rank may be. The reference images may be ranked by the ranking module 505. The ranking module 505 may rank the reference images by one or more classifiers. In some embodiments, different ranking methods may be used for different images with different types or different contents. In some embodiment, the ranking module 505 may rank the reference images based on one or more feature differences between each ROI/VOI image of the reference images and the ROI/VOI image of the image-to-be-identified by the LambdaMART algorithm.

In 609, the image search system 100 may determine one or more reference images based on the ranking result. As used herein, the similarity between the one or more reference images and the image-to-be-identified may satisfy a specific condition. For example, in the ranking result, the higher the similarity between the image-to-be-identified and a corresponding reference image is, the higher the rank may be. In some embodiments, the top 5, 10, or 20 reference images may be determined according to the ranking result. The reference images may be determined by the output device 130. In some embodiments, the image search system 100 may determine the image-to-be-identified, the ROI/VOI image of the image-to-be-identified, one or more reference images, ROI/VOI image(s) of the one or more reference images, etc.

During the image search process, operations 601, 602, and 603 may be performed in a training phase, wherein the image search system 100 may extract the features of the ROI/VOI image(s) of the one or more reference images, generate feature sets respectively, perform feature selections on the feature sets based on a feature selection algorithm, and generate feature subsets respectively. In some embodiments, operations 604, 605, 607, 608, and 609 may be performed in a test phase, and the image search system 100 may extract the features of the ROI/VOI image of the image-to-be-identified based on the feature parameters corresponding to the feature subsets of the reference images, and generate the feature set. Further, the image search system 100 may analyze the feature subsets of the reference images and the feature set of the image-to-be-identified, obtain the feature data, rank the reference images based on the obtained feature data, and determine the reference images similar to the image-to-be-identified based on the ranking result.

Obviously, the image analysis process illustrated in FIG. 6 only represents some embodiments of the present disclosure. Those having ordinary skills in the art, without further creative efforts, may make various modifications, additions, and deletions under the teachings of the descriptions of the image analysis device 122. For example, the feature subset B of the reference images may be stored in the storage device 140 or other parts of the image search system 100 in advance, and may be compared with the feature set C of the image-to-be-identified to obtain the feature differences.

Figure 7:
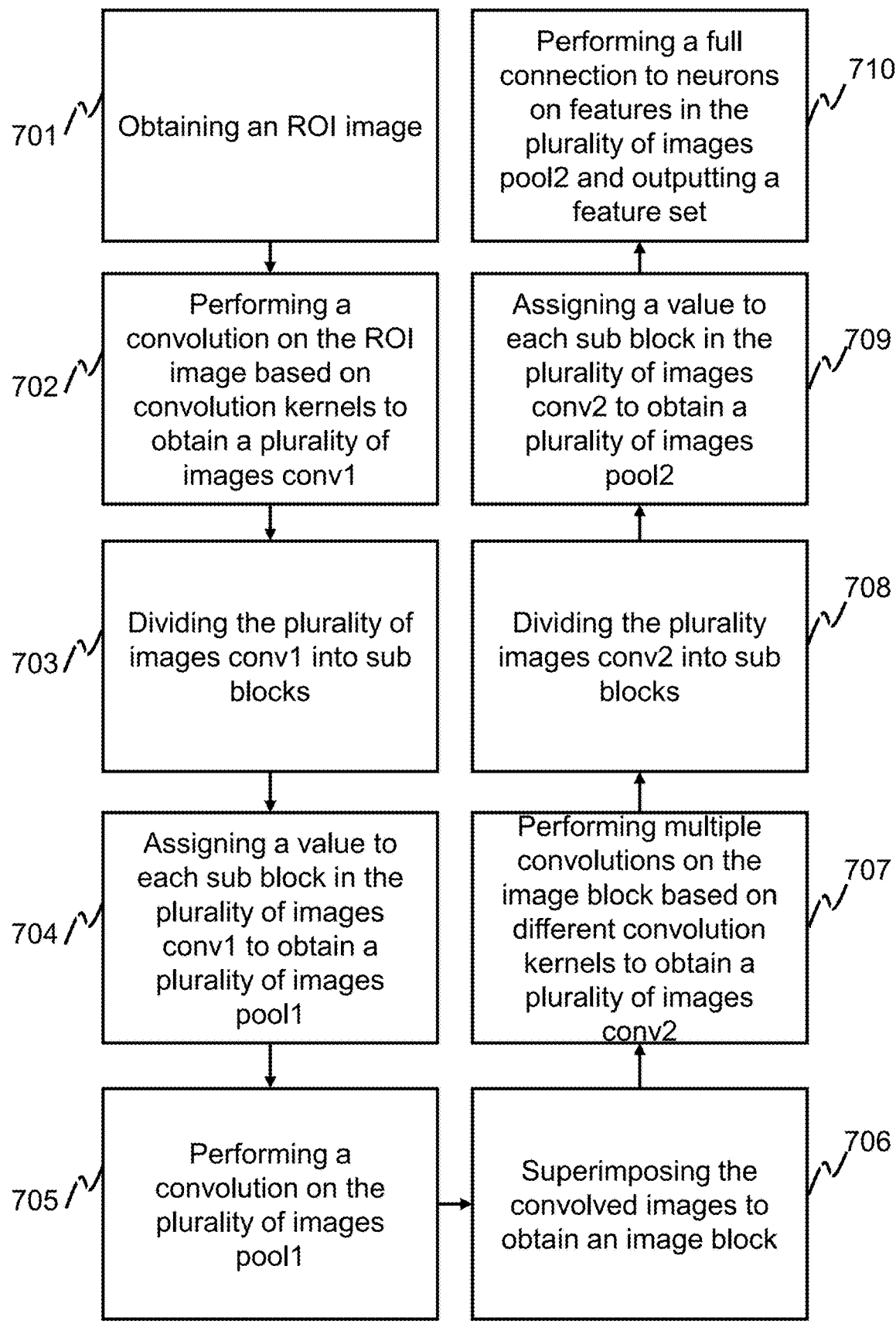
FIG. 7 is a flowchart illustrating an exemplary process for extracting features of an ROI image according to some embodiments of the present disclosure.

FIG. 7 is a flowchart illustrating an exemplary process for extracting features of an ROI image according to some embodiments of the present disclosure. In some embodiments, the extraction of the features of the ROI image may be performed based on the first parameter and/or the second parameter using a convolution neural network algorithm.

In 701, the image search system 100 may obtain an ROI image. The ROI image may be an ROI image of the image-to-be-identified or an ROI image of a reference image. The ROI image may be an image with any resolution. In some embodiments, the ROI image may be 20*20, 28*28, etc.

In 702, the image search system 100 may perform multiple convolutions on the ROI image using the first group of convolution kernels based on a convolution neural network to obtain a plurality of images conv1. In some embodiments, the sizes of the convolution kernels in the first group of convolution kernels may be 3*3, 5*5, or another size. The number of the convolution kernels may be set manually or may be adjusted based on the resolution of the ROI image. Merely as an example, the number of the convolution kernels may be 10 or 20. The convolution kernels included in the first group of convolution kernels may be the same, partly the same, or different. In a specific embodiment, for a 28*28 ROI image, a convolution may be performed using the first group of convolution kernels including twenty 5*5 convolution kernels to obtain twenty 24*24 images.

In 703, the image search system 100 may divide the one or more images conv1 into a plurality of sub-blocks. The sub-blocks may include part or all information of the images conv1. In some embodiments, the image search system 100 may generate the plurality of sub-blocks by intercepting a certain number of pixels in the plurality of images conv1. For example, the image search system 100 may divide one of the 24*24 images in the above embodiment into 12*12 sub-blocks, wherein the size of each sub-block is 2*2.

In 704, the image search system 100 may traverse the sub-blocks in an image conv1 and assign a value to each sub-block to obtain a new image. For example, in the above embodiment, the image search system 100 may extract the maximum value of gray levels of the pixels in each 2*2 sub-block as the pixel value of the sub-block, and further, obtain a 12*12 image. For one of the pluralities of images conv1, an image pool1 may be obtained by extracting the maximum values of the sub-blocks in the image respectively. For the plurality of images conv1, a plurality of images pool1 may be obtained by extracting the maximum values of the sub-blocks in the plurality of images conv1 respectively. For example, in the above embodiment, for the twenty 24*24 images, sub-blocks may be divided, and the maximum values may be extracted, and further twenty 12*12 images may be obtained.

In 705, a convolution may be performed on the one or more images pool1 based on the second group of convolution kernels. In some embodiments, the kernels in the second group of convolution kernels may be 3*3, 5*5, or another size. The number of the convolution kernels may be set manually or may be adjusted based on the resolution of the ROI image. The convolution kernels in the second group of convolution kernels may be the same, partly the same, or different.

In 706, parts or all of the convoluted images may be superposed to obtain an image block. In 707, a plurality of convolutions may be performed in the image block based on the third group of convolution kernels to obtain a plurality of images conv2. In 708, one or more of the plurality of images conv2 may be divided into sub-blocks. In 709, the sub-blocks in one of the pluralities of images conv2 may be traversed, and each of the sub-blocks may be assigned a value to obtain a new image. In some embodiments, the maximum value in each sub-block may be extracted and designated as a pixel in the new image. For one of the pluralities of images conv2, an image pool2 may be obtained by extracting the maximum values of the sub-blocks in the image respectively. For the plurality of images conv2, a plurality of images pool2 may be obtained by extracting the maximum values of the sub-blocks in the plurality of images conv2 respectively. In 710, pixels in the plurality of images pool2 may be expressed as feature vectors, and a fully connection to neurons may be performed on the feature vectors to obtain a certain number of features. In fully connection layers, each neuron in a lower layer may be associated with all neurons in an upper layer.

Obviously, the feature extraction process of an ROI image illustrated in FIG. 7 only represents some embodiments of the present disclosure. Those having ordinary skills in the art, without further creative efforts, may make various modifications, additions, and deletions under the teachings of the descriptions of the image analysis device 122. For example, the same convolution principle may be used in operations 702, 705, and 707, and the first group of convolution kernels, the second group of convolution kernels, and the third group of convolution kernels may be the same or different. The division of the sub-blocks in operations 703 and 708 may be the same or different. The values of the sub-blocks in operations 704 and 709 may be determined based on methods other than extracting the maximum values. For example, an average value of all the pixels may be selected, or a value determined based on pixels that exceed a threshold.

Figure 8:
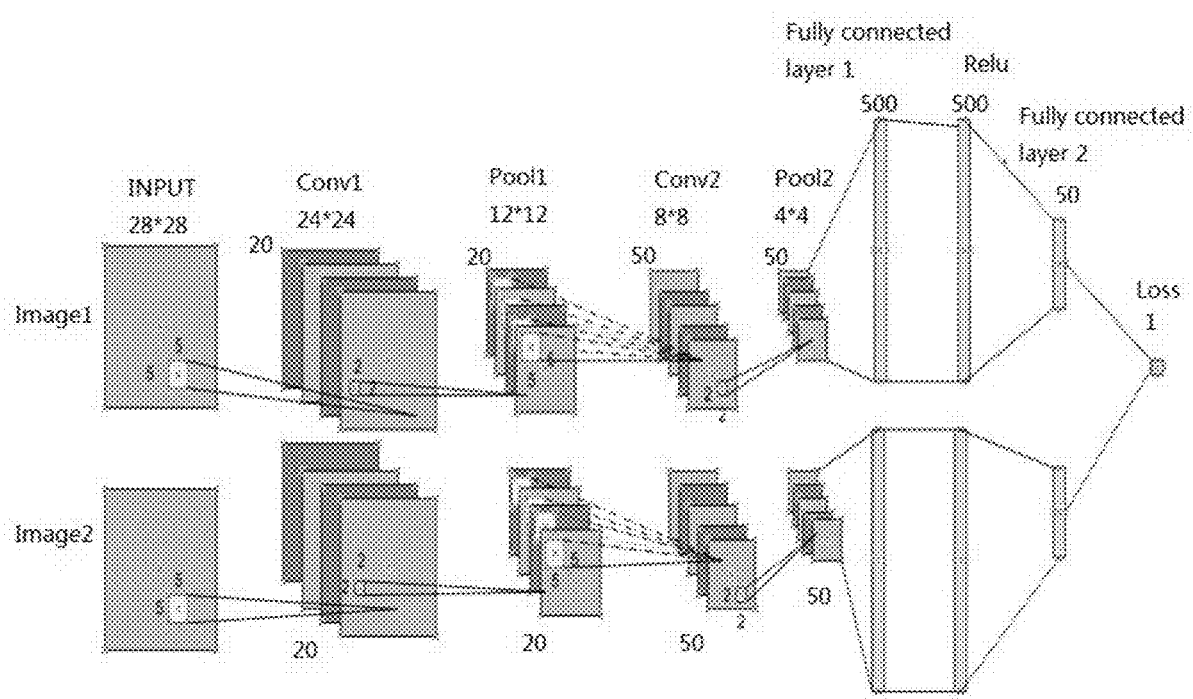
FIG. 8 is a flowchart illustrating an exemplary process for extracting features based on a convolution neural network according to some embodiments of the present disclosure.

FIG. 8 is a flowchart illustrating an exemplary process for feature extraction based on a convolution neural network according to some embodiments of the present disclosure. As illustrated, the feature extraction based on a convolution neural network may include the following steps: (1) A 28*28 ROI image pair may be loaded, the ROI image pair may include an ROI image of an image-to-be-identified and an ROI image of a reference image. (2) A convolution may be performed on an ROI image based on twenty 5*5 convolution kernels to obtain twenty 24*24 images respectively. (3) Each of the twenty 24*24 images may be divided into 12*12 sub-blocks, and the size of each sub-block is 2*2. For each sub-block, the maximum value may be extracted to obtain a 12*12 image. The process may be performed on each of the twenty 24*24 images to obtain twenty 12*12 images. (4) A convolution may be performed on each group of the twenty 12*12 images in step (3) based on different 5*5 convolution kernels respectively to obtain twenty 8*8 images; further, the twenty 8*8 images may be superposed to obtain an 8*8 image. (5) Step (4) may be performed for fifty times based on different convolution kernels to obtain fifty 8*8 images, wherein the number of the convolution kernels used in steps (4) and (5) is 50*20. (6) For each of the fifty 8*8 images, the maximum value in 2*2 block may be extracted to obtain fifth 4*4 images. (7) The 4*4*50 features may be fully connected to 500 neurons, and 500 features may be outputted. (8) For each of the ROI image inputted in step (1), steps (2)~(7) may be performed. (9) A feature selection may be performed on a sample set including the 500 features based on a feature selection algorithm (e.g., CFS algorithm) used by the feature selection module 503, feature data of the ROI image may be obtained based on a feature data analysis algorithm used by the feature analysis module 504, and references image may be ranked based on an algorithm (e.g., LambdaMART algorithm) used by the ranking module 505 to obtain reference images similar to the image-to-be-identified.

The reference images may be ranked according to a loss function generated based on the ROI images of the reference images and the ROI image of the image-to-be-identified. In the convolution neural network illustrated in FIG. 8, the image search system 100 may construct a Siamese network for two ROI images, and further determine a loss function of the Siamese network. Formula (1) is an exemplary loss function of the Siamese network:

$$E = \frac{1}{2N}\sum_{i=1}^{N}\{y_i \times d_i + (1-y_i)\max(1-d_i, 0)\} \qquad (1)$$

$$(L_{i1}, L_{i2}, \Lambda, L_{im})(R_{i1}, R_{i2}, \Lambda, R_{im}).$$

N refers to the number of samples; that is, the number of the image pairs generated by the image-to-be-identified and the reference images; $y_i$ refers to the similarity of the ith image pair, where $y_i=1$ indicates that the images are similar, $y_i=0$ indicates that the images are dissimilar; a refers to the distance between the features of the ith image pair, $$d_i = \sum_{j=1}^{m}(L_{ij} - R_{ij})^2,$$

the features of the left nodule are $(L_{i1}, L_{i2}, \Lambda, L_{im})$, and the features of the right nodule are $(R_{i1}, R_{i2}, \Lambda, R_{im})$.

Figure 9:
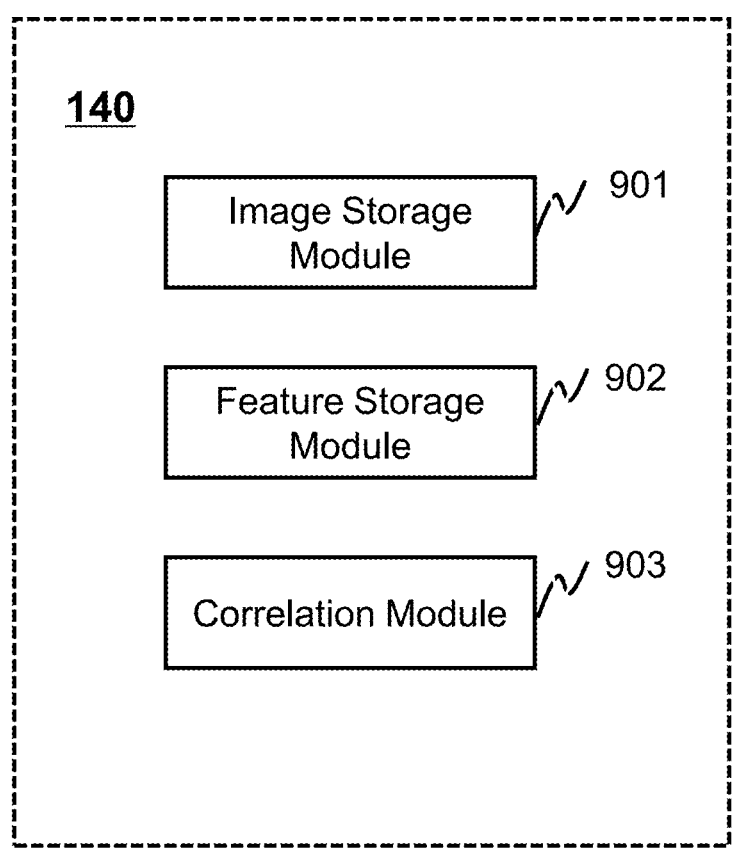
FIG. 9 is a schematic diagram illustrating an exemplary storage device according to some embodiments of the present disclosure.

FIG. 9 is a schematic diagram illustrating an exemplary storage device 140 according to some embodiments of the present disclosure. The storage device 140 may include an image storage module 901, a feature storage module 902, a correlation module 903, and/or other parts that can perform functions of the storage device 140. Obviously, the storage device 140 illustrated in FIG. 9 only represents some embodiments of the present disclosure. Those having ordinary skills in the art, without further creative efforts, may make various modifications, additions, and deletions under the teachings of the descriptions of the storage device 140. For example, two modules of the storage device 140 may be combined into a single module, or one module of the storage device 140 may be divided into two or more modules.

The image storage module 901 may store the image-to-be-identified and/or the reference images. The image-to-be-identified and/or the reference images may be stored at various suitable time points. For example, the image-to-be-identified and/or the reference images may be stored after the reference images similar to the image-to-be-identified are determined. The image-to-be-identified and/or the reference images may be stored in any format supported by the image search system 100. In some embodiments, the image-to-be-identified and/or the reference images may be stored in the format of Digital Imaging and Communications in Medicine (DICOM).

The feature storage module 902 may store the features of the ROI/VOI image of the image-to-be-identified and/or the features of the ROI/VOI images of the reference images. In some embodiments, the features of the ROI/VOI image of the image-to-be-identified, the features of the ROI/VOI images of the reference images, and the feature differences between the features of the ROI/VOI image of the image-to-be-identified and the features of the ROI/VOI images of the reference images may be stored in the feature storage module 902. The features may be stored in the storage device 140 according to a specific storage structure. In some embodiments, the feature storage module 902 may set a feature tree (e.g., feature index tree based on Euclidean Distance) to store the features in the storage device 140.

The correlation module 903 may be configured to correlate the images stored in the image storage module 901 and the image features stored in the feature storage module 903. In some embodiments, the correlation module 903 may set a correlation table to correlate the images and the image features. The correlation table may include storage names and storage paths of the image-to-be-identified and/or the reference images, and storage names and storage paths of the image features.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined into suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Numbers describing compositions and properties are used in some embodiments. It should be understood that such numbers used for embodiment description are described with "about," "approximately" or "substantially." Unless otherwise indicated, "about," "approximately" or "substantially" indicates that the numbers allow a variation of ±20%. Accordingly, in some embodiments, the numerical parameters used in specification and claims are approximations that may change according to the desired characteristics of individual embodiments. In some embodiments, significance digits of the numerical parameters should be considered, and a predetermined number of bits reserved for the general method should be applied. Although the application of some embodiments for confirming the scope and breadth of the numerical parameters are approximations domain, in this embodiment, the set value of such extent practicable, as precisely as possible the specific implementation.

For each patent cited in this application, patent applications, patent applications, publications and other materials, such as articles, books, brochures, publications, documents, and other objects, in its entirety is hereby incorporated herein by reference. With the exception of the application of conflict or inconsistent application history, the present application claims the widest range restricted files except (attached to this application or after the current). It should be noted that, if the use of this application as described in the companion material, definitions, and/or terms of the content of the present application have a place to inconsistency or conflict, the description of the present application, the use of definitions and/or terms shall prevail.

Finally, it should be understood that the embodiments described herein are only intended to illustrate the principles of the present application embodiment. Other Modifications may also belong to the scope of the present application. Thus, by way of example and not limitation, embodiments of the present application may be considered an alternative configuration of the embodiment consistent with the teachings of the present application. Accordingly, the present application is not limited to the embodiments of the present application describes a clear and embodiments described herein.

We claim:

1. A method, comprising:
   obtaining a first image;
   determining a first region in the first image;
   obtaining a second image;
   determining a second region in the second image;
   obtaining a third image;
   determining a third region in the third image;
   before feature extraction based on a convolution neural network algorithm, determining, based on resolution of the first image, a count of convolution kernels for each convolution layer of the convolution neural network algorithm;
   extracting a first group of features of the first region based on the convolution neural network algorithm;
   extracting a second group of features of the second region based on the convolution neural network algorithm;
   extracting a third group of features of the third region based on the convolution neural network algorithm;
   calculating first similarity between the first region and the second region based on the first group of features and the second group of features;
   calculating second similarity between the first region and the third region based on the first group of features and the third group of features; and
   ranking the second image and the third image based on the first similarity between the first region and the second region and the second similarity between the first region and the third region.

2. The method of claim 1, further comprising:
   setting a second parameter, and extracting a second feature set related to the second region, the second feature set including the second group of features; and
   extracting the first group of features related to the first region based on the second group of features.

3. The method of claim 2, wherein the second group of features is selected from the second feature set based on a feature selection algorithm.

4. The method of claim 3. wherein the feature selection algorithm is a Correlation Based Feature Selection Algorithm.

5. The method of claim 2, wherein the second parameter comprises at least one of a number of convolution neural network layers, a size of a convolution kernel, or a number of generated features.

6. The method of claim 1, wherein the convolution neural network algorithm comprises a multilayer structure.

7. The method of claim 1, wherein the first similarity is determined based on a convolution neural network with at least two pooling layers and at least two convolution layers.

8. The method of claim 1, wherein the second similarity is determined based on a convolution neural network with at least two pooling layers and at least two convolution layers.

9. The method of claim 1, further comprising:
   ranking the second image and the third image by a LambdaMART algorithm.

10. The method of claim 1, further comprising:
    determining the second image or the third image based on the ranking.

11. The method of claim 1, further comprising:
    positioning the first region in the first image by a computer-aided diagnosis.

12. The method of claim 11, further comprising:
    selecting the second region of the second image by the computer-aided diagnosis based on the first region.

13. The method of claim 1, wherein the first image, the second image, or the third image is a two-dimensional image or a three-dimensional image, the method further comprising:
    determining whether the first image, the second image, and/or the third image are two-dimensional images or three-dimensional images by determining whether there is 3D data in the first image, the second image, and/or the third image.

14. The method of claim 1, wherein the first image, the second image or the third image is at least one of a PET image, a CT image, a SPECT image, an MPI image, or an ultrasonic image.

15. A system, comprising:
at least one storage device storing a set of instructions; and
at least one processor being in communication with the at least one storage device, wherein when executing the set of instructions, the at least one processor is configured to cause the system to perform operations including:
obtaining a first image;
determining a first region in the first image;
obtaining a second image;
determining a second region in the second region;
obtaining a third image;
determining a third region in the third image;
before feature extraction based on a convolution neural network algorithm, determining, based on resolution of the first image, a count of convolution kernels for each convolution layer of the convolution neural network algorithm;
extracting a first group of features of the first region based on the convolution neural network algorithm;
extracting a second group of features of the second region based on the convolution neural network algorithm;
extracting a third group of features of the third region based on the convolution neural network algorithm;
calculating first similarity between the first region and the second region based on the first group of features and the second group of features;
calculating second similarity between the first region and the third region based on the first group of features and the third group of features; and
ranking the second image and the third image base on the first similarity between the first region and the second region and the second similarity between the first region and the third region.

16. The system of claim 15, wherein the operations further include:
setting a second parameter, and extracting a second feature set related to the second region, the second feature set including the second group of features; and
extracting the first group of features related to the first region based on the second group of features.

17. The system of 16, wherein the second group of features is selected from the second feature set according to a feature selection algorithm.

18. The system of 16, wherein the second parameter comprises at least one of a number of convolution neural network layers, a size of a convolution kernel, or a number of generated features.

19. The system of claim 15, wherein the operations further include:
positioning the first region in the first image by a computer-aided diagnosis.

20. The system of claim 19, wherein the operations further include:
selecting the second region of the second image by the computer-aided diagnosis based on the first region.

* * * * *